Sept. 3, 1957  J. POLDERVAART ET AL  2,805,138
PROCESS FOR THE PREPARATION OF ARTIFICIAL FERTILIZER
Filed Jan. 19, 1953
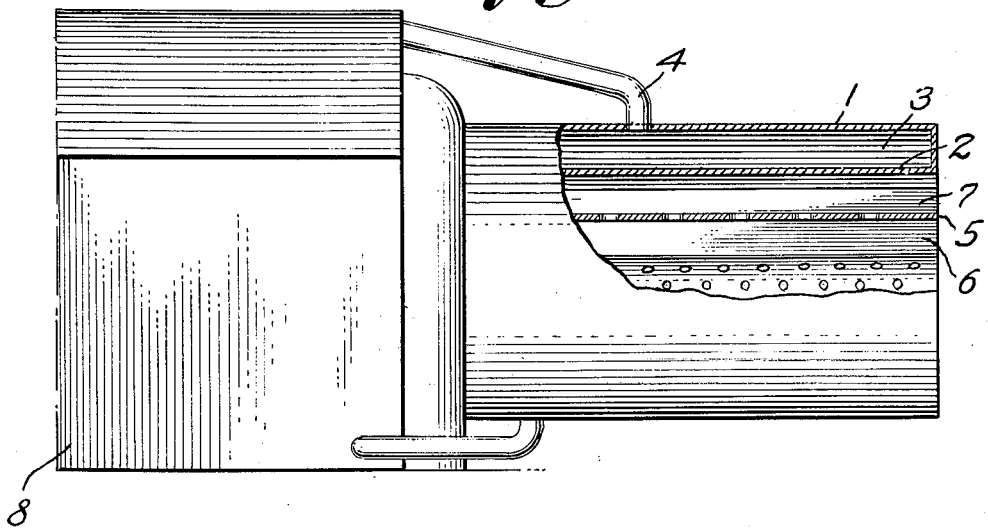
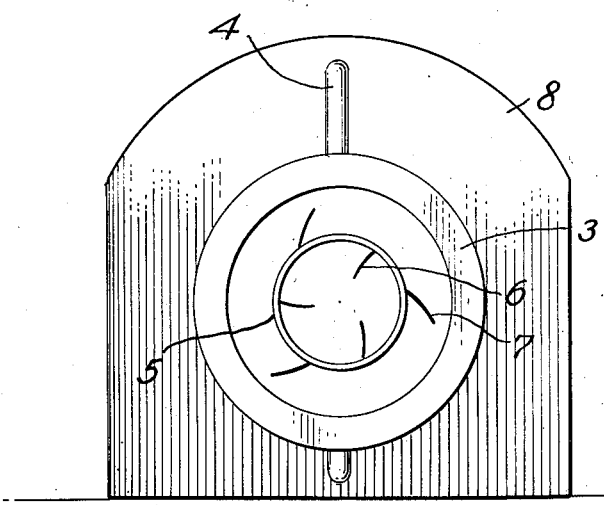
J. POLDERVAART
W. A. KUYVENHOVEN
T. C. VAN DEN DOOL
A. 'T HART  INVENTORS
BY Wenderoth, Lind & Ponack
ATTYS.

United States Patent Office 2,805,138
Patented Sept. 3, 1957

2,805,138

PROCESS FOR THE PREPARATION OF ARTIFICIAL FERTILIZER

Jacob Poldervaart, Maassluis, Willem Arie Kuyvenhoven, Maasdijk, Teunis Cornelis van den Dool, De Lier, and Arie 't Hart, Maassluis, Netherlands Application January 19, 1953, Serial No. 331,878

Claims priority, application Netherlands January 18, 1952

2 Claims. (Cl. 71—25)

The invention has for its object to provide a process for the preparation of artificial fertilizer, which process is started from a waste matter which to date has been thrown away as being totally unfit for use.

In the present case contaminated fuller's earth resulting from the use of fuller's earth in the treatment of hydrocarbons in oil refineries is used as a starting product. This so-called fuller's earth is a material giving very much trouble.

Up to now it has been necessary to discharge this contaminated fuller's earth in very certain places, as it has already appeared that when this matter is buried, e. g. in the neighborhood of water, a layer of oil appears on the water within a very short time.

The applicants have found that when contaminated fuller's earth is heated in supply of oxygen, a residue is obtained containing eminent foodstuffs for plants. During times, in which oil is scarce, e. g. during the war, lixiviation of fuller's earth in order to liberate the oil being present in same has been carried out. Also in that case the residue has been thrown away as being absolutely worthless.

It has been found that when contaminated fuller's earth is burned, a residue is obtained which is excellently suited as artificial fertilizer. The new product is a very fine powder, which can easily be spread and under circumstances can be sprayed with a suitable apparatus.

The apparatus to be used consists, according to the invention, substantially of a cooled casing in which a perforated drum is rotatably mounted in such a way that between the drum and the casing a circular space is formed and in which the drum has blades on the inner and outer wall in order to keep the products of combustion in motion.

The contaminated fuller's earth being supplied to the space surrounded by the drum is kept in motion during the combustion by means of the blades fixed to the inner wall of the drum, whereby the partly burned fuller's earth comes through the perforations into the space contained between the drum and the casing and is kept in motion in this circular space by the blades fixed on the outer side of the drum.

Preferably the blades on the inner wall of the drum are directed in such a way that they can remove the fuller's earth from the inlet and the blades on the outer side of the drum can move the products of combustion in the direction of the inlet.

The casing surrounding the perforated drum is preferably a double-walled casing and cooling water, which is heated by the combustion gases, can then be preheated prior to its being led to a boiler.

The invention is illustrated in the accompanying drawing in which:

Fig. 1 is a side elevation view, partly in cross-section of a combustion apparatus according to this invention; and Fig. 2 is an end elevation view of the apparatus of Fig. 1.

The apparatus according to the invention consists substantially of a casing formed by the walls 1 and 2, so that an annular cooling jacket 3 is formed through which cooling water can flow. The cooling water heated by the combustion gases can then be carried off through the tube 4, said tube being connected to the water pipes of a boiler. A perforated drum is provided in the cooling jacket and is positioned in such a way that an annular space is formed between the casing and the drum 5. The drum 5 has on the inner wall blades 6 and on the outer wall blades 7. The drum 5 is rotatably mounted in the casing and can, e. g. by means of an electric motor or the like be rotated. The feeding of fuel, in the present case contaminated fuller's earth, can be carried out by means of a worm gear, which is well known in itself and forms no part of the invention, so that it is not further described here.

The apparatus according to the invention can be used with boilers for central heating and can in that case be placed without the necessity for additional equipment before the firebox of the boiler. The blades 6 are directed in such a way that they can transport the fuel toward the firebox, whereas the blades 7 are directed in such a way, that the products of combustion can be transported away from the firebox and can be collected.

The apparatus according to the invention works as follows:

A small quantity of contaminated fuller's earth and wood fiber or another easily inflammable product is lighted in the perforated drum 5. Then the automatic fuel supply apparatus is started and the process of combustion will further proceed automatically. Since the fuel, in the present case the contaminated fuller's earth, always comes into contact with the blades 6, it cannot cake together and a good air supply for the combustion is guaranteed. The incompletely burned particles will be thrown through the perforations in the drum 5 into the space between the casing and the drum 5. In this space said particles cannot cake together as the blades 7 keep the particles in motion and a further oxygen supply is also guaranteed here sufficient to complete combustion. The particles completely burned to ash are transported back by the blades 7 to the front side of the apparatus and they can be collected there.

We claim:

1. A process for preparing a fertilizer from the contaminated fuller's earth resulting from the use of fuller's earth in the treatment of hydrocarbons in oil refineries, said contaminated fuller's earth containing absorbed oil, comprising feeding said contaminated fuller's earth to a cylindrical combustion zone axially thereof, supplying sufficient oxygen to said zone to incompletely burn said contaminated fuller's earth, agitating said contaminated fuller's earth during said incomplete burning to produce relatively small particles, passing said incompletely burned particles radially outwardly of said combustion zone to an annular zone of combustion surrounding said cylindrical zone, supplying further oxygen to said annular zone sufficient to complete the burning of the incompletely burned particles and to form a fine ash, and passing said fine ash out of said annular zone in a direction which is parallel to and in the reverse direction from the direction in which said contaminated fuller's earth is fed to said cylindrical combustion zone.

2. A process for preparing a fertilizer from the contaminated fuller's earth resulting from the use of fuller's earth in the treatment of hydrocarbons in oil refineries, said contaminated fuller's earth containing absorbed oil, comprising igniting said contaminated fuller's earth in the presence of oxygen, agitating the ignited contaminated fuller's earth to maintain the combustion process to incompletely burn the contaminated fuller's earth and to prevent caking of the burning contaminated fuller's earth and supplying further oxygen sufficient to complete combustion of the contaminated fuller's earth to a fine ash suitable for application as a fertilizer.

References Cited in the file of this patent

UNITED STATES PATENTS

| | | |
|---|---|---|
| 125,017 | Brown | Mar. 26, 1872 |
| 224,217 | Norton | Feb. 3, 1880 |
| 288,782 | Edwards | Nov. 20, 1883 |
| 847,749 | Ellis | Mar. 19, 1907 |
| 1,489,702 | Hare | Apr. 8, 1924 |
| 2,242,639 | Barton | May 20, 1941 |
| 2,246,345 | Campbell | June 17, 1941 |
| 2,307,795 | Kearby | Jan. 12, 1943 |

OTHER REFERENCES

Parsons: Fuller's Earth, Bureau of Mines, bulletin 71, Mineral Technology 3, 1913, pages 1–38.

Salmi: Chemically Prepared Absorptive Clays and Their Application in the Purification of Oils, Fats and Waxes 1926, Filtrol Company, pages 1–33.

Nutting: A Study of Bleach Solubility, reprinted from the Journal of the Franklin Institute, vol. 224, No. 3, September 1947, pages 339–362.